United States Patent
Gattu et al.

(10) Patent No.: US 11,232,106 B1
(45) Date of Patent: Jan. 25, 2022

(54) WINDOWED QUERY WITH EVENT-BASED OPEN TIME FOR ANALYTICS OF STREAMING DATA

(71) Applicant: Amazon Technologies, Inc., Seattle, WA (US)

(72) Inventors: Praveen Kumar Gattu, Sammamish, WA (US); Nagesh V. Honnalli, Seattle, WA (US); Gaurav D. Ghare, Seattle, WA (US); Christopher James Bradfield, Seattle, WA (US); Ryan Nienhuis, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 678 days.

(21) Appl. No.: 15/934,691

(22) Filed: Mar. 23, 2018

(51) Int. Cl.
| | |
|---|---|
| G06F 16/2455 | (2019.01) |
| H04L 12/24 | (2006.01) |
| H04L 12/26 | (2006.01) |
| G06F 16/248 | (2019.01) |
| G06F 16/28 | (2019.01) |

(52) U.S. Cl.
CPC ...... *G06F 16/24568* (2019.01); *G06F 16/248* (2019.01); *G06F 16/285* (2019.01); *H04L 41/14* (2013.01); *H04L 43/14* (2013.01)

(58) Field of Classification Search
CPC ............ G06F 16/24568; G06F 16/248; G06F 16/285; H04L 41/14; H04L 43/14
See application file for complete search history.

(56) References Cited

U.S. PATENT DOCUMENTS

| | | | |
|---|---|---|---|
| 10,594,578 B1 * | 3/2020 | Staggs | H04L 67/2852 |
| 2011/0016160 A1 * | 1/2011 | Zhang | G06F 16/24 707/805 |
| 2011/0078177 A1 * | 3/2011 | Fakeih | G06F 16/2474 707/769 |
| 2014/0201355 A1 * | 7/2014 | Bishnoi | H04L 41/0622 709/224 |
| 2016/0103882 A1 * | 4/2016 | Deshmukh | G06F 16/2455 707/770 |
| 2016/0285711 A1 * | 9/2016 | Akidau | H04L 47/28 |
| 2017/0039245 A1 * | 2/2017 | Wholey, III | G06F 16/9024 |
| 2018/0089328 A1 * | 3/2018 | Bath | G06F 16/9535 |
| 2018/0089334 A1 * | 3/2018 | Raitz | G06Q 10/067 |
| 2018/0089561 A1 * | 3/2018 | Oliner | G06N 3/0454 |
| 2018/0121035 A1 * | 5/2018 | Filippi | G06F 40/14 |
| 2018/0307731 A1 * | 10/2018 | Xiao | G06F 17/16 |
| 2019/0130004 A1 * | 5/2019 | Singh | G06F 9/4881 |
| 2019/0235919 A1 * | 8/2019 | Bareness | G06F 16/25 |
| 2020/0050465 A1 * | 2/2020 | Ravid | G06F 9/44505 |

* cited by examiner

*Primary Examiner* — Pierre M Vital
*Assistant Examiner* — Zuheir A Mheir
(74) *Attorney, Agent, or Firm* — Lee & Hayes, P.C.

(57) ABSTRACT

Windowed queries with event-based open times are described for use in data analytics for streaming data. A window semantic may be used to define windowed queries of an analytics application that, when executed against an incoming data stream, open a window at a time when a first event associated with a grouping key is received by a windowed query. The window remains open for a predefined duration specified in the windowed query, and query results may be generated based on any events associated with the grouping key that are received while the window remains open. After a lapse of the predefined duration, the window closes, and the query results may be output in association with the window.

20 Claims, 10 Drawing Sheets

R1: {PT: 11:00}
R2: {ID: A, ET: 11:00, PT: 11:02}
R3: {ID: A, ET: 11:01, PT: 11:03}
R4: {ID: B, ET: 11:01, PT: 11:03}
R5: {ID: A, ET: 11:01, PT: 11:04}
R6: {ID: B, ET: 11:01, PT: 11:04}
R7: {ID: A, ET: 11:02, PT: 11:05}
R8: {PT: 11:05}
R9: {ID: A, ET: 11:06, PT: 11:07}
R10: {PT: 11:10}
R11: {PT: 11:15}

⎫ — 202 Incoming Records

Timeline Walkthrough Table (windowed query execution) — 200

| Processing Time | 11:00 | 11:02 | 11:03 | 11:04 | 11:05 | 11:07 | 11:10 | 11:15 |
|---|---|---|---|---|---|---|---|---|
| Events | R1: {WM} | R2: {ID: A, ET: 11:00} | R3: {ID: A, ET: 11:01} R4: {ID: B, ET: 11:01} | R5: {ID: A, ET: 11:01} R6: {ID: B, ET: 11:01} | R7: {ID: A, ET: 11:02} R8: {WM} | R9: {ID: A, ET: 11:06} | R10: {WM} | R11: {WM} |
| Window w/: Key = (A, 11:00), Range = [11:02, 11:07) | | Open, Count = 1 | Count = 2 | Count = 3 | Count = 4 | Close, {ID: A, ET: 11:00, Count: 4} | | |
| Window w/: Key = (B, 11:00), Range = [11:03, 11:08) | | | Open, Count = 1 | Count = 2 | | Close, {ID: B, ET: 11:01, Count: 2} | | |
| Window w/: Key = (A, 11:05), Range = [11:07, 11:12) | | | | | | Open, Count = 1 | | Close, {ID: A, ET: 11:06, Count: 1} |

Results Table — 204

| Expected Results | Event-Based Window – Actual Results | |
|---|---|---|
| {ID: A, ET: 11:00, Count: 4} | {ID: A, ET: 11:00, Count: 4} | ← 116(1) |
| {ID: B, ET: 11:01, Count: 2} | {ID: B, ET: 11:01, Count: 2} | ← 116(2) |
| {ID: A, ET: 11:06, Count: 1} | {ID: A, ET: 11:06, Count: 1} | ← 116(3) |

FIG. 2

WINDOWED QUERY WITH EVENT-BASED OPEN TIME FOR ANALYTICS OF STREAMING DATA

BACKGROUND

A network-based data analytics service performs real-time analytics on streaming data so that customers of the service are able to gain valuable insights into the data. Because a stream of incoming data flows continuously through a network-based analytics system, the data is unbounded by nature. Accordingly, tools are often provided to a customer to define bounds on the incoming data stream. One such tool is a windowed query that executes continuously against the incoming data stream. Today, a customer can define a windowed query by specifying a window duration (e.g., one minute) of a window that opens when the current time reaches a set time, and remains open for the specified window duration (e.g., a one-minute window opens and closes every minute, on the minute). The network-based analytics service will then perform computations on the incoming data stream using the windowed query to obtain query results that are bounded in time.

This kind of windowing approach comes with drawbacks when there is "late arriving data" at the network-based analytics system. For instance, records of an incoming data stream can be received as events, and there is often a delay between the time when an event occurs (event time) at the streaming source and the time when the corresponding record is actually processed (processing time) by the network-based analytics system. This can causes a given window to be offset relative to the event time, which can cause query results to be split across multiple windows when those results ideally would be grouped in a single window. This produces windows with partial results, which leads to inefficiencies for the customer, such as when the customer spends extra time amending or merging results to obtain results that are meaningful to the customer.

The disclosure made herein is presented with respect to these and other considerations.

BRIEF DESCRIPTION OF THE DRAWINGS

FIG. 2 is a diagram illustrating a timeline walkthrough of an example windowed query that executes against an incoming data stream.

DETAILED DESCRIPTION

Figure 1:
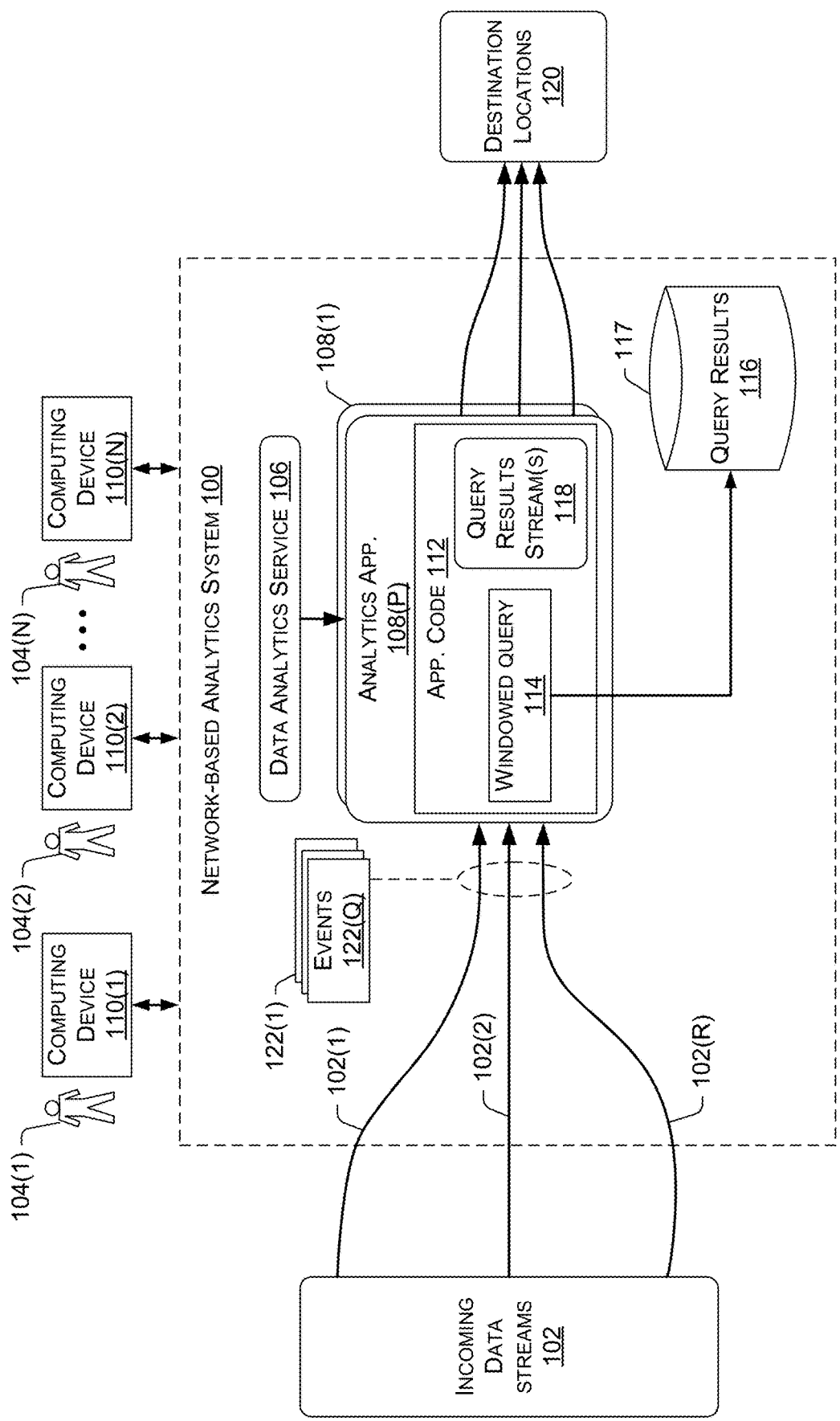
FIG. 1 is a software and network architecture diagram showing aspects of the operation of a network-based analytics system to process incoming data streams on behalf of customers.

Described herein are, among other things, techniques, devices, and systems for implementing windowed queries with windows that have event-based open times, and using the windowed queries for data analytics of streaming data. In particular, a window semantic can be used to define a windowed query of an analytics application in a way that mitigates the adverse impact(s) of late arriving events, as described above. In an example, the window semantic allows a customer to specify a duration of a window in a windowed query that is configured to open a new window at a time when a first event associated with a grouping key of the window is received by the windowed query. In other words, the opening of the window is event-based; not time-based. Therefore, a new window does not open at a predefined time, but, rather, a new window opens whenever a predefined event is received. Because a new window opens based on the receipt of an event, rather than opening at a set time, late-arriving events of an incoming data stream are less likely to cause partial query results that are split across multiple windows, which reduces the instances where a customer has to amend or merge partial results to derive meaningful (or accurate) results therefrom.

In an example process, a windowed query may execute against an incoming data stream by opening a window at a time when a first event associated with a grouping key is received by the windowed query. The window may be kept open for a predefined duration specified in the windowed query. Query results may be generated based on any events associated with the grouping key that are received while the window remains open. After a lapse of the predefined duration, the window closes, and the query results may be output in association with the window.

Implementations of the techniques and systems described herein can improve the functioning of the systems with respect to conventional systems. In particular, the implementations described herein allow a network-based analytics system to output accurately-grouped query results, as compared to conventional analytics systems for processing incoming data streams. This provides a better-performing data analytics system that mitigates the adverse impacts noted above, such as query results that include partial results split across multiple windows. Resources, such as processing resources, may also be conserved by reducing, if not avoiding altogether, post processing operations (e.g., amending or merging operations) that may otherwise have been performed in conventional systems in order to merge partial results when there is late arriving data (or events).

Customer experience is also improved by the techniques and systems described herein by mitigating the burden on the customer to amend or merge partial results that would otherwise be generated in conventional analytics systems. Technical benefits other than those specifically mentioned herein can also be realized through an implementation of the disclosed technologies.

It should be appreciated that the subject matter presented herein can be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations can be performed in combination with other types of program modules. Generally, program modules include routines, programs, components, data structures, and other types of structures that perform particular tasks or implement particular abstract data types.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

FIG. 1 is a software and network architecture diagram showing aspects of the operation of a network-based analytics system 100 (sometimes shortened to "system 100") to process incoming data streams 102(1), 102(2), . . . , 102(R) (collectively 102) on behalf of customers 104(1), 104(2), . . . 104(N) (collectively 104), according to one particular configuration. The system 100 may represent a computing network, with various networked-computing systems and devices, configured to provide computing resources (sometimes referred to simply as "resources") on a permanent or an as-needed basis. For example, the system 100 may provide a data analytics service 106 to allow customers 104 to create resources in the form of analytics applications 108(1)-(R) (collectively 108) that are used to process incoming data streams 102. It is to be appreciated that the network-based analytics system 100 may be part of a larger computing network/system that is configured to provide additional types of network-based services and/or provide additional types of computing resources. For example, the network-based analytics system 100 may be part of a system that also provides, without limitations, data processing resources, data storage resources, virtual machine ("VM") instances, networking resources, data communication resources, network services, and/or other types of computing resources and associated network-based services.

The network-based analytics system 100 can be accessed using an appropriate computing system, such as the computing devices 110(1), 110(2), . . . , 110(N) (collectively 110), to communicate with the system 100 and/or the data analytics service 106 over an appropriate data communications network. In this way, a customer 104 of the data analytics service 106 can create, manage/update/change, use, and/or delete analytics applications 108 by configuring various aspects of the operation of the analytics applications 108, or to otherwise control any computing resources being utilized by a customer 104.

In a general example, and without limitation, a computing device 110 can be utilized by a customer 104 of the data analytics service 106 to purchase, rent, lease, etc., and use (e.g., create, manage/update/change, delete) computing resources, such as the analytics applications 108, and/or to configure aspects of the operation of the computing resources, and/or to access and utilize functionality provided by the various services, tools, environments, and systems described herein, and/or to perform other types of functionality with regard to the operation of the computing resources provided by the network-based analytics system 100.

The computing devices utilized to configure and monitor the resources in the system 100 (e.g. the computing devices 110) can be any type of computing device capable of connecting to the system 100 and/or communicating with the data analytics service 106 via a suitable data communications network such as, but not limited to, a laptop or desktop computer, a tablet computing device, a server computer, or a smartphone.

Administrative users employed by the owner or operator of network-based analytics system 100, such as administrators managing the operation of the data analytics service 106, and/or the computing devices of the system 100, can also connect with, manage, and utilize resources provided by the system 100 in a similar fashion. Additional details regarding the configuration and operation of the network-based analytics system 100 will be provided below with regard to FIGS. 8-11.

In the example of FIG. 1, and without limitation, the network-based analytics system 100 can implement a network-based, data analytics service 106. The data analytics service 106 can perform analytics (e.g., in real-time) on streaming data so that customers 104 of the service 106 are able to gain valuable insights into the data. The streaming data is shown in FIG. 1 in the form of incoming data streams 102 that are ingested (or otherwise received) by the network-based analytics system 100. A customer 104 that wants to utilize the data analytics service 106 can provide customer input to the system 100 to create one or more analytics applications 108. This customer input may create application code 112 of the analytics application 108 that is configured to execute (e.g., continuously) against an incoming data stream 102 of interest to the customer 104. The application code 112 of the analytics application 108 may be configured to process an incoming data stream 102 by executing, among other things, a windowed query 114 against the incoming data stream 102. The customer 104 may define such a windowed query 114 with customer-defined parameters.

In an illustrative example, the customer 104(1) of the data analytics service 106 may own and/or operate a website that services requests from users. The customer 104(1) can utilize the data analytics service 106 to create an analytics application 108(1) that analyzes a continuous flow of data (e.g., clickstream data) that is received from the customer's web server(s) as an incoming data stream 102(1). The customer 104(1) may define parameters of a windowed query 114 of the analytics application 108(1) that is to execute against the incoming data stream 102(1), and the analytics application 108(1) may thereafter generate query results 116 of the windowed query 114 as it analyzes the incoming data stream 102(1) using the windowed query 114. The query results 116 may be output (e.g., in a query results stream 118) for consumption by the customer 104(1) so that the customer 104(1) can gain valuable insights into the data. The query results 116 may be output directly via the query results stream(s) 118 (e.g., without persisting the query results 116 in memory, although the query results 116 may be temporarily cached in this scenario). Additionally, or alternatively, as shown in the example of FIG. 1, the query results 116 may be stored in a storage medium 117 (e.g., a data store, storage resource, etc.), such as a storage location that is external to the analytics application 108. The customer 104(1) may specify a destination location(s) 120 where the query results 116 are to be sent (or delivered), and the query results stream(s) 118 can ultimately be sent by the analytics application 108 to the customer-specified destination location(s) 120. In some embodiments, an analytics application 108 may include multiple staggered windowed queries 114, and may perform additional processing on the query result stream(s) 118 before the query results 116 are sent (e.g., as final application output) by the analytics application 108 to the destination location(s) 120. In some embodiments, the destination location(s) 120 may represent a storage location where the query results 116 are to be stored for later access by the customer 104(1). Query results 116 can vary and may relate to any suitable analytics measure (e.g., any suitable statistics that can be computed on data of the incoming data streams 102). In the running example, the customer 104(1) may want to know the number of requests received on the customer's website over a particular time period of interest, and may configure the analytics application 108(1) to use the windowed query 114 to output query results 116 that pertain to a count of the number of requests in any given period of time (i.e., query results 116 that are bounded in time).

The incoming data streams 102 can relate to any type of data. In the aforementioned example, the incoming data stream 102(1) may pertain to clickstream data, such as data that indicates when customers select an element of interest on a website. As another example, another customer 104(2) may configure an Internet of Things (IoT) device(s) to provide a continuous flow of IoT data to the system 100 as another incoming data stream 102(2), and the customer's 104(2) analytics application(s) 108(2) may be executed against that incoming data stream 102(2) to output query results 116 from the stream of IoT data. Other examples of incoming data streams 102 include, without limitation, stock trading data, audience tracking data, order placement data, and the like.

The network-based analytics system 100, and specifically a windowed query 114 of an analytics application 108, may receive events 122(1)-(Q) (collectively 122) whenever a new record of incoming data is processed (or read out) from an incoming data stream 102. Thus, "events," as used herein can correspond to an incoming record (sometimes referred to as a "data row" of an incoming records table). However, "events," as used herein, are not limited to incoming records (or data rows) of an incoming data stream 102 because events can also be received based on internally-generated operations (internal relative to the system 100). For instance, the data analytics service 106 may generate something called a "watermark" on a periodic basis (or on some other basis), which may be received as an event by the windowed query 114 of the analytics application 108. These "watermark events" do not correspond to the data of the incoming data streams 102, but are nevertheless tracked as incoming records along with records pertaining to data of the incoming data streams 102. Thus, the events 122(1)-(Q) in FIG. 1 are meant to correspond to "stream events" that relate to data of an incoming data stream 102, and are not meant to correspond to watermark events. In light of the above, the term "event" herein is not limited solely to streaming events pertaining to data of the incoming data stream 102.

Because an incoming data stream 102 provides a continuous flow of data to the system 100, the windowed query 114 of a given analytics application 108 can execute against the incoming data stream 102 in order to bound the data and to provide query results 116 that are meaningful to the customer 104. The windowed query 114 represents one that is configured to open a window based on a received stream event 122. This can be contrasted with conventional windowed queries (sometimes called "tumbling" windows) that open a new window at a set time. Accordingly, the windowed query 114 of an analytics application 108(1) may execute against an incoming data stream 102(1) by opening a window at a time when a first event 122(1) associated with a grouping key of the window is received by the windowed query 114 of the analytics application 108(1). As mentioned, the first event 122(1) that causes the opening of the window is a stream event 122 that corresponds to first data of the incoming data stream 102(1). The analytics application 108 may deduce that the received first event 122(1) is a stream event based on the first event 122(1) being associated with the grouping key for the window. The analytics application 108(1) may keep the window open for a predefined duration specified in the windowed query 114 of the analytics application 108(1), and may generate query results 116 based at least in part on the first event 122(1), and based on any additional events 122 (stream events) associated with the grouping key that are received while the window remains open. It may be the case that no other stream events 122 are received while the window remains open. The window may close upon a lapse of the predefined duration, and the analytics application 108(1) may output the query results 116 in association with the window. After the window is closed, a new window may be opened if and when another stream event 122 associated with the grouping key of the window is received by the windowed query 114 the analytics application 108, and this process may iterate by iteratively opening windows based on received stream events 122, and generating query results 116 associated with those windows. It is to be appreciated that an analytics application 108 may include other types of clauses and/or queries, including clauses and/or queries (e.g., SQL queries) that are not windowed queries, and/or including additional (i.e., multiple) windowed queries 114, which may execute before a given windowed query 114 opens a new window. Thus, data of an incoming data stream 102 may be analyzed by a pipeline, or a series, of queries and/or functions, and a given windowed query 114 may be situated anywhere along that pipeline such that when data of the incoming data stream 102 is processed by the windowed query 114, an internal stream event 122 may be created and received by the windowed query 114 to trigger the opening of a window. This includes scenarios where other clauses or queries in the analytics application 108 modify data of the incoming data stream 102 before the data arrives at the windowed query 114 (e.g., a filter clause with record_type="stock_data"). Thus, a first stream event 122 that triggers the opening of a window of the windowed query 114 may correspond to data of the incoming data stream 102 that has been modified (e.g., filtered) with respect to the data that first arrives at the analytics application 108. In some cases, a windowed query 114 may be referred to herein as a "windowed query function 114".

FIG. 2 is a diagram illustrating a timeline walkthrough table 200 of an example windowed query 114 that executes against an incoming data stream 102. FIG. 2 shows a set of incoming records 202 that may be processed by an analytics application 108, such as one of the analytics applications 108 introduced in FIG. 1. Each record in the set of incoming records 202 may be received as an event, and at least some of the incoming records 202 correspond to stream events 122 (events 122 that correspond to data of an incoming data stream 102). In this example, records R2, R3, R4, R5, R6, R7, and R9 correspond to stream events 122. Meanwhile, records R1, R8, R10, and R11 correspond to watermark events. As noted above, these watermark events correspond to internally-generated watermarks (WMs). Watermarks may be generated on a periodic basis (or some other basis), and received by the windowed query 114 of the analytics application 108 in between the receipt of incoming stream events 122. In the example of FIG. 2, a watermark received by an analytics application 108 every five minutes, which is shown by the incoming record R1 at 11:00, followed by the incoming record R8 at 11:05, followed by the incoming record R10 at 11:10, followed by the incoming record R11 at 11:15, and so on, for every 5 minute increment. In between these watermark events are stream events 122 that correspond to data of an incoming data stream 102.

Each of the incoming records 202 (or events) are shown as being associated with a timestamp corresponding to the time when the corresponding event is received by the windowed query 114 of the analytics application 108. This timestamp is sometimes referred to herein as a "processing time (PT)" of the incoming record 202 to indicate the time when the corresponding record 202 is actually processed (processing time) by the analytics application 108 of the system 100. Thus, the incoming records 202 are shown as being associated with a "PT" timestamp in FIG. 2.

Meanwhile, the incoming stream events 122 may be received with an additional client-supplied timestamp. This timestamp is sometimes referred to herein as an "event time (ET)" of the incoming record 202 to indicate the time when an event occurs at the streaming source. For example, a streaming source, such as a web server, may register a user request on a website, and may timestamp this event with the event time (ET) before it is transmitted to the network-based analytics system 100 in an outgoing data stream. Thus, when the windowed query 114 of the analytics application 108 receives the stream event 122, the corresponding incoming record 202 is associated with an additional timestamp (an "ET" timestamp), as shown in FIG. 2. The records 202 corresponding to watermark events are not associated with an ET timestamp because they are internally-generated at the network-based analytics system 100 and are, therefore, not associated with data that is incoming from a streaming source.

FIG. 2 shows that any given ET timestamp may have a different value than the value of the PT timestamp for a given record 202. This may occur for various reasons, but a common issue causing this difference is when the reference clock of the streaming source is not synchronized with the reference clock of the network-based analytics system 100. When these clocks are not synchronized (and/or when other issues, such as connection issues or latency issues arise), the PT timestamp may have a different value than the value of the ET timestamp, and the PT timestamp is usually a later time-based value. Accordingly, a record RX ("X" being any integer) is said to be a late arriving record (corresponding to a late arriving stream event 122) if RX.ET<RX.PT, which means that the ET timestamp associated with the incoming record 202 is less than the PT timestamp for the incoming record 202.

The incoming records 202 that correspond to stream events 122 are also shown as being associated with an identifier, such as the respective identifiers having value of "A" and "B" (ID:A and ID:B in FIG. 2). This identifier (ID) may represent any suitable data that is used to group arriving stream events 122 into windows of the windowed query 114. That is, a windowed query 114 of the analytics application 108 may specify a grouping key, which may be a k-part key on which arriving stream events 122 are to be grouped. Thus, when an arriving stream event 122 associated with a first grouping key (e.g., ID:A in FIG. 2) of a window is received by the windowed query 114, the windowed query 114 of the analytics application 108 is configured to group that stream event 122 in an existing/open window having that first grouping key, or, if no window is open with that first grouping key, the analytics application 108 may open a new window with that first grouping key. Likewise, when an arriving stream event 122 associated with a second grouping key (e.g., ID:B in FIG. 2) of a window is received by the windowed query 114, the windowed query 114 of the analytics application 108 is configured to group that stream event 122 in an existing/open window having that second grouping key, or, if no window is open with that second grouping key, the analytics application 108 may open a new window with that second grouping key.

Consider an example of FIG. 2 where a customer 104 wants to count results grouped by FLOOR(ET to 5 MIN), Id, which means that a FLOOR function is used to group the incoming records 202 into 5-minute windows (duration=5 minutes) of the windowed query 114 by rounding down the PT timestamp of individual records to a nearest whole time unit (e.g., hour, minute, second, and so on). Alternatively, a STEP function can be used to group the incoming records 202 into windows by rounding down the PT timestamp of individual records to a nearest value at an arbitrary interval (e.g., a nearest value at an interval of 30 seconds). Alternatively, a FLOOR or STEP function may not be utilized at all. Also assume, for this example, that watermarks are received by the analytics application 108 every 5 minutes. The timeline walkthrough table 200 illustrates how a windowed query 114 with an event-based open time can execute against an incoming data stream 102 to generate query results 116.

The incoming records 202 in the timeline walkthrough table 200 are listed in the second row of the table 200, which is labeled "events." The processing time (PT) timestamps of the incoming records 202 are listed in the first row of the table 200. The third row of the timeline walkthrough table 200 shows the moments when a window associated with a first grouping key (e.g., ID: A in FIG. 2) opens and closes, and also shows how the first query results 116(1) are generated while the window remains open. The fourth row of the timeline walkthrough table 200 shows the moments when a window associated with a second grouping key (e.g., ID:B in FIG. 2) opens and closes, and also shows how the second query results 116(2) are generated while the window remains open. In this case, the first query results 116(1) and the second query results 116(2) are generated based on a COUNT operation of the windowed query 114 that counts the number of stream events 122 that are received by the windowed query 114 while a given window remains open.

Thus, when an event corresponding to the first incoming record, R1, is received by the windowed query 114 of the analytics application 108 at 11:00 in processing time (PT), the analytics application 108 determines that the event is not associated with any of the grouping keys (ID:A and ID:B), and, as a consequence, a window is not opened at 11:00 in processing time (PT). When a next event 122 corresponding to the second incoming record, R2, is received by the windowed query 114 of the analytics application 108 at 11:02 in processing time (PT), the analytics application 108 determines that the event 122 is associated with the grouping key (ID:A), and, as a consequence, a window for that grouping key is opened at 11:02 in processing time (PT).

This window-opening operation is shown in the third row of the timeline walkthrough table 200, which also shows that first query results 116(1) are generated based on the event 122 received at 11:02. In this case, the COUNT operation causes a counter to be incremented to a value of 1. Thus, the event 122 corresponding to the second incoming record, R2, represents a first stream event 122 associated with a particular grouping key (e.g., ID:A) that is received by the windowed query 114 of the analytics application 108. Notably, the window is not opened earlier than a time when the first stream event 122 associated with the grouping key (ID:A) is received. A conventional 5-minute "tumbling" window, by contrast, would open every 5 minutes (e.g., tumbling windows would open at 11:00, 11:05, 11:10, etc.), and thus, a first tumbling window of a conventional windowed query would open at 11:00 in processing time (PT). Instead, here, analytics application 108 with the windowed query 114 waits until the first stream event 122 associated with a particular grouping key is received before opening a first window of that windowed query 114. In this example, since the first stream event 122 associated with a grouping key having a value of "A" is received at 11:02 in processing time (PT), the first window does not open until 11:02 in processing time (PT).

After opening the window at 11:02 in processing time (PT), the analytics application 108 keeps the window open for the predefined duration specified in the windowed query 114 (in this case, for a duration of 5 minutes), and generates additional first query results 116(1) based on any additional stream events 122 associated with the grouping key with a value of "A" that are received while the window remains open. Thus, when an event 122 corresponding to the third incoming record, R3, is received by the windowed query 114 of the analytics application 108 at 11:03 in processing time (PT), the analytics application 108 determines that the event 122 is associated with the grouping key (ID:A), and, as a consequence, additional first query results 116(1) based on the event 122 are generated (e.g., by incrementing a count to a value of 2). When an event 122 corresponding to the fourth incoming record, R4, is received by the windowed query 114 of the analytics application 108 at 11:03 in processing time (PT), the analytics application 108 determines that the event 122 is associated with the second grouping key (ID:B), and, as a consequence, a window for that second grouping key is opened at 11:03 in processing time (PT). This window-opening operation is shown in the fourth row of the timeline walkthrough table 200, which also shows that second query results 116(2) are generated based on the event 122 received at 11:03. In this case, the COUNT operation causes a counter to be incremented to a value of 1 for the window associated with the second grouping key. Thus, the event 122 corresponding to the fourth incoming record, R4, represents a first stream event 122 associated with a second grouping key (e.g., ID:B) that is received by the windowed query 114 of the analytics application 108. Notably, the window associated with this second grouping key is not opened earlier than a time when the first stream event 122 associated with the second grouping key (ID:B) is received. In other words, the analytics application 108 with the windowed query 114 waits until the first stream event 122 associated with the second grouping key (ID:B) is received before opening a first window of that windowed query 114 for that second grouping key (ID:B). In this example, since the first stream event 122 associated with a grouping key having a value of "B" is received at 11:03 in processing time (PT), the first window for the second grouping key (ID:B) does not open until 11:03 in processing time (PT), which is staggered with respect to the first window for the first grouping key (ID:A), which opened at 11:02 in processing time (PT).

When an event 122 corresponding to the fifth incoming record, R5, is received by the windowed query 114 of the analytics application 108 at 11:04 in processing time (PT), the analytics application 108 determines that the event 122 is associated with the first grouping key (ID:A), and, as a consequence, additional first query results 116(1) based on the event 122 are generated (e.g., by incrementing a count to a value of 3 for the window associated with the first grouping key (ID:B)). When an event 122 corresponding to the sixth incoming record, R6, is received by the windowed query 114 of the analytics application 108 at 11:04 in processing time (PT), the analytics application 108 determines that the event 122 is associated with the second grouping key (ID:B), and, as a consequence, additional second query results 116(2) based on the event 122 are generated (e.g., by incrementing a count to a value of 2 for the window associated with the second grouping key (ID:B)).

When an event 122 corresponding to the seventh incoming record, R7, is received by the windowed query 114 of the analytics application 108 at 11:05 in processing time (PT), the analytics application 108 determines that the event 122 is associated with the grouping key (ID:A), and, as a consequence, additional first query results 116(1) based on the event 122 are generated (e.g., by incrementing a count to a value of 4 for the window associated with the first grouping key (ID:A)). In this example, a watermark event corresponding to the eighth incoming record, R8, may represent another watermark received at a 5 minute interval. The count is not incremented based on this watermark event record, R8. Note that the window for the first grouping key, with a duration of 5 minutes, and an open time of 11:02 in processing time (PT), is set to close at 11:07 in processing time (PT). Accordingly, when an event 122 corresponding to the ninth incoming record, R9, is received by the windowed query 114 of the analytics application 108 at 11:07 in processing time (PT), the predefined duration of the window for the first grouping key (ID:A) has lapsed, and the window is closed with the query results 116(1) for the windows showing a count of 4. The count of 4 for the window associated with the first grouping key (ID:A), in this example, corresponds to the number of stream events 122 (not including watermark events, and not including the event 122 corresponding to the ninth incoming record, R9) associated with the first grouping key that were received while the window remained open. For the event 122 corresponding to the ninth incoming record, R9, the analytics application 108 determines that the event 122 is associated with the grouping key (ID:A), and, as a consequence, a new window for that grouping key (ID:A) is opened at 11:07 in processing time (PT). This window-opening operation is shown in the fifth row of the timeline walkthrough table 200, which also shows that query results 116 are generated based on the event 122 received at 11:07. In this case, the COUNT operation causes a counter to be incremented to a value of 1 for the new window The window for the second grouping key, with a duration of 5 minutes, and an open time of 11:03 in processing time (PT), remains open at 11:07 and is set to close at 11:08. In the example of FIG. 2, no more stream events 122 associated with either of the two grouping keys are received before the next watermark event is received for the tenth incoming record, R10, at 11:10 in processing time (PT). At this point, the predefined duration of the window for the second grouping key (ID:B) has lapsed, and the window is closed with the query results 116(2) for the window showing a count of 2. The count of 2 for the window associated with the second grouping key (ID:B), in this example, corresponds to the number of stream events 122 (not including watermark events) associated with the second grouping key that were received while the window remained open. The third window for the first grouping key, with a duration of 5 minutes, and an open time of 11:07 in processing time (PT), remains open at 11:10 and is set to close at 11:12. In the example of FIG. 2, no more stream events 122 associated with the first grouping key are received before the next watermark event is received for the eleventh incoming record, R11, at 11:15 in processing time (PT). At this point, the predefined duration of the third window for the first grouping key (ID:A) has lapsed, and the window is closed with the query results 116(3) for the window showing a count of 1. The count of 1 for the third window associated with the first grouping key (ID:A), in this example, corresponds to the number of stream events 122 (not including watermark events) associated with the first grouping key that were received while the third window for the first grouping key remained open. The query results 116(1), 116(2), and 116(3) can be output (or emitted) for the first window as {ID:A, ET: 11:00, Count: 4}, for the second window as {ID:B, ET: 11:01, Count: 2}, and for the third window as {ID:A, ET: 11:06, Count: 1}, respectively. As shown in the results table 204 in FIG. 2, these query results 116(1), 116(2), and 116(3) correspond to the expected result.

The first query results 116(1) can be contrasted with partial results of a conventional "tumbling" windowed query that would be split across multiple windows. For instance, consider a conventional tumbling windowed query that would open a first tumbling window at the set time of 11:00 in processing time (PT), and this first tumbling window would then remain open until 11:05 in processing time (PT). Because the window duration is typically exclusive on the closing side, the first tumbling window would close with a count of 3, and a second tumbling window would open at 11:05 in processing time (PT), and this second tumbling window would then remain open until 11:10, and would close with a count of 2. This illustrates how the results of a conventional tumbling windowed query would be output as a count of 3 in the first tumbling window and a count of 2 in the second tumbling window. In other words, all five stream events associated with the first grouping key (ID:A) were expected to be grouped in the same window, and a tumbling windowed query would split these results into two windows; one window having a count of 3 and the other window having a count of 2. A customer in this situation would have to amend or merge these partial results on the backend. Thus, the windowed query 114 of the present disclosure mitigates these issues by outputting query results 116(1) and 116(2) as shown in the results table 204, which correspond to the expected result (e.g., a single window with a count of 4).

Figure 3:
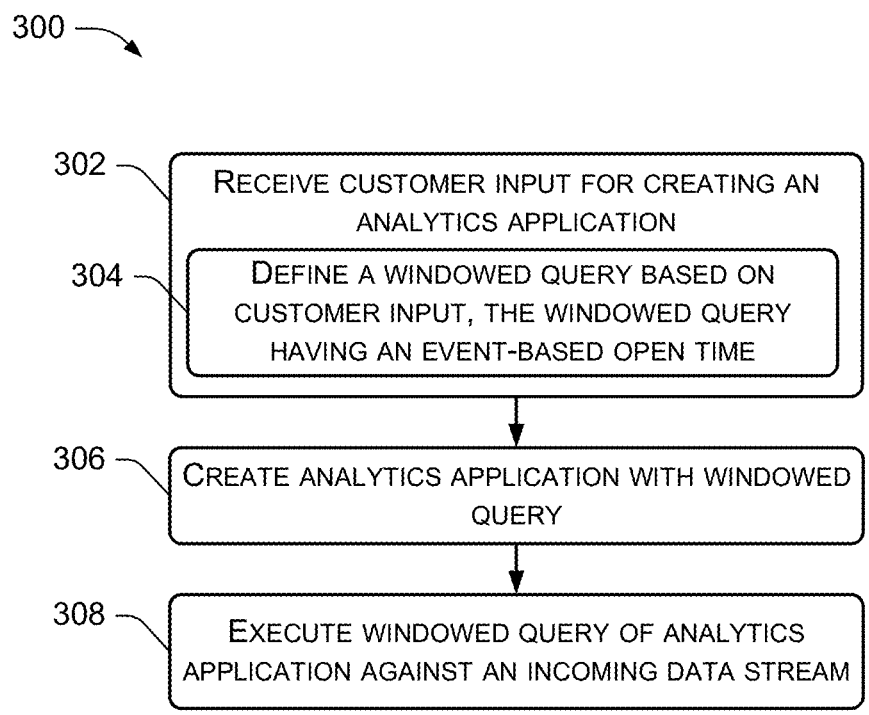
FIG. 3 is a flow diagram of an example process for creating and executing a customer-defined analytics application that includes a windowed query with an event-based open time.
Figure 4:
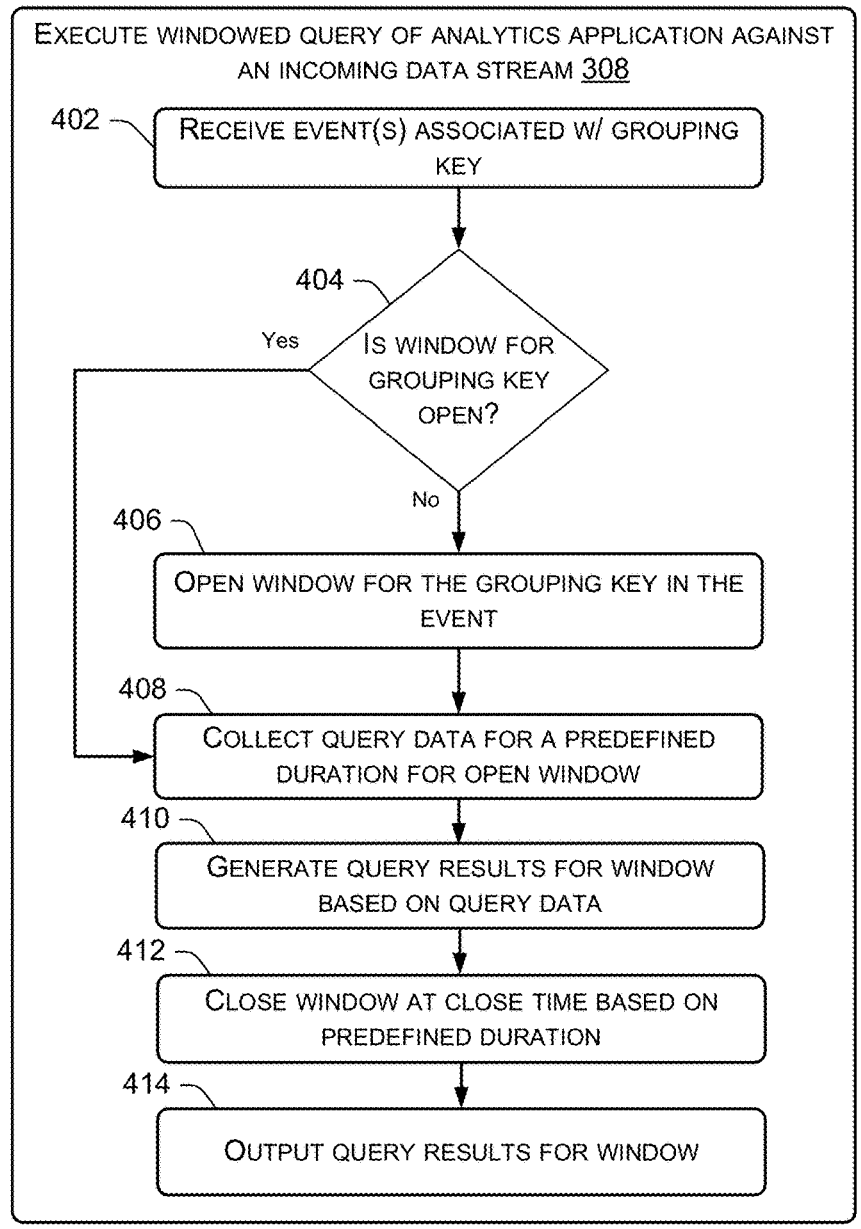
FIG. 4 is a flow diagram of an example process for executing a windowed query of an analytics application against an incoming data stream, the windowed query configured to open a window at a time of receiving an event.
Figure 5:
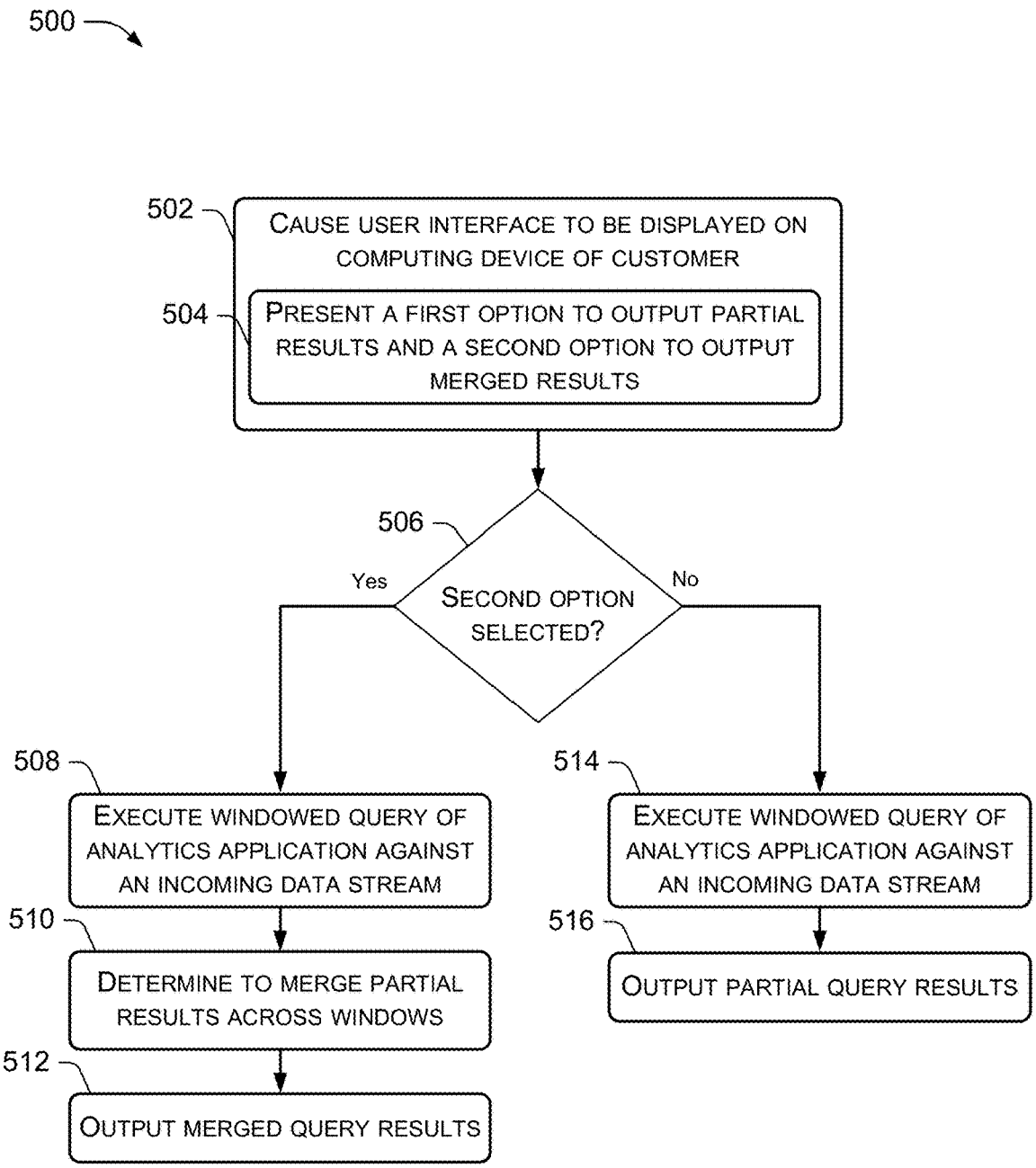
FIG. 5 is a flow diagram of an example process for allowing a customer to set preferences to have the network-based data analytics service merge partial results on the customer's behalf.

FIGS. 3-5 show flow diagrams of processes illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

FIG. 3 is a flow diagram of an example process 300 for creating and executing a customer-defined analytics application 108 that includes a windowed query 114 with an event-based open time. The process 300 is described, by way of example, with reference to the previous figures.

At 302, a data analytics service 106 of a network-based analytics system 100 may receive customer input to create an analytics application 108. As shown with sub-block 304, the customer input may include one or more customer-defined parameters to define a windowed query 114 of the analytics application 108. In particular, the windowed query 114 may be configured to open windows based on receiving a stream event 122 associated with a particular grouping key. In defining the windowed query 114 at sub-block 304, the customer 104 may write application code 112 that specifies, without limitation, a duration for a window of the windowed query 114, a grouping key on which arriving stream events 122 are to be grouped, and possibly other parameters. The windowed query 114 may be a Structured Query Language (SQL) query written by the customer 104. In some embodiments, user interfaces, command line interfaces (CLIs), and/or other types of interfaces to the data analytics service 106 may be exposed to the customer 104 on a computing device 110, and these interfaces may enable the customer 104 to define parameters of the windowed query 114. For instance, the network-based analytics system 100 may provide a query editor interface with built-in templates to assist the customer 104 in writing the windowed query 114. These types of interfaces may also provide a testing function for the customer 104 to test the windowed query 114 on simulated streaming data before the windowed query 114 is actually implemented.

In some embodiments, the customer input received at 302 may further include a customer-specified input data stream 102 (e.g., a customer selection of an input data stream 102 among multiple available input data streams 102). The customer input received at 302 may also specify a destination location(s) 120 where query results 116 are to be sent, and possibly stored. This destination location(s) 120 can be any suitable location, such as a cloud-based storage container that is provided by a network-based storage system 100, and/or a client-side storage location that is locally accessible to the computing device 110, and/or an analytics platform that receives the query results 116, or any combination thereof.

At 306, the data analytics service 106 of the network-based analytics system 100 may create an analytics application 108 based at least in part on customer input received at block 302. This analytics application 108 can be maintained and executed by the network-based analytics system 100 on behalf of the customer 104, perhaps with other analytics applications 108 the customer 104 may have created. The analytics application 108 may be maintained as a resource by the network-based analytics system 100 that can be used on a permanent or as-needed basis (e.g., on-demand).

At 308, the analytics application 108 of the network-based analytics system 100 may execute the windowed query 114 against an incoming data stream 102. In this manner, the analytics application 108 can (e.g., continuously) process an incoming data stream 102 by executing the windowed query 114 in order generate query results 116 that are bounded in time into groups (or windows). This allows for provisioning query results 116 that are meaningful to the customer 104.

FIG. 4 is a flow diagram of an example process 400 for executing a windowed query 114 of an analytics application 108 against an incoming data stream 102, the windowed query 114 configured to open a window at a time of receiving an event 122 corresponding to data of the incoming data stream 102 (i.e., a stream event 122). The process 400 is described, by way of example, with reference to the previous figures, and the process 400 may represent a sub-process of the operations performed at block 308 of the process 300 of FIG. 3.

At 402, as part of an analytics application 108 executing a windowed query 114 against an incoming data stream 102, the windowed query 114 of the analytics application 108 may receive a first stream event 122 associated with a grouping key of the window. Because the event 122 received at block 402 is associated with a grouping key, the event 122 is a stream event that corresponds to first data of the incoming data stream 102 that is being processed by the analytics application 108 using a windowed query 114, and does not represent a watermark event. That is, the analytics application 108 can determine that the event 122 received at block 402 is a stream event corresponding to incoming data by virtue of the event 122 being associated with the grouping key. As discussed above, watermarks may be generated, and events corresponding thereto may be received by the windowed query 114 of the analytics application 108, but the watermark events do not cause the opening of the window of the windowed query 114 and/or the collection of query data for an open window because they are not associated with the grouping key. This can be seen, for example, in FIG. 2, where receipt of the watermark event for the first incoming record, R1, does not cause the window of the windowed query 114 to open, but the receipt of the subsequent stream event 122 for the second incoming record, R2, causes the window of the windowed query 114 to open based on the event 122 being associated with the first grouping key.

At 404, the analytics application 108 may determine whether a window associated with the grouping key is currently open. If such a window is not currently open at block 404, the analytics application 108 may treat the receipt of the stream event 122 at block 402 as a triggering event that, upon detection, may cause the analytics application 108 to open a window for the grouping key in the stream event 122 at block 406 by following the "no" route from block 404 to block 406. Moreover, the window is opened at block 406 at a time when the first stream event 122 associated with the grouping key of the window is received (at block 402) by the windowed query 114 of the analytics application 108. Thus, if the stream event 122 received at block 402 is the first stream event 122 associated with grouping key that is received while no window for that grouping key is presently open, the receipt of the stream event 122 at block 402 may cause the analytics application 108 to detect a triggering event detected that triggers the opening of the window.

At 408, in response to opening a new window at block 406, or in response to determining that a window associated with the grouping key is not currently open (and following the "yes" route from block 404 to block 408), the analytics application 108 may collect query data from the incoming data stream for a predefined duration specified in the windowed query 114 of the analytics application 108. For example, the customer 104 may have specified (e.g., in customer input received at block 302 of the process 300 of FIG. 3) a window duration of 5 minutes, and as such, the window, in that example, would be kept open for a duration of 5 minutes while query data is collected from the incoming data stream, the query data being based at least in part on the first stream event 122 and any additional stream events 122 associated with the grouping key that are received before a lapse of the predefined duration.

At 410, the analytics application 108 may generate query results 116 based at least in part on the query data collected at block 408 (e.g., based at least in part on the first stream event 122 received at block 402). For example, the windowed query 114 may include a COUNT operation/function, and the query results 116 generated at 410 may be a count of a number of stream events 122 (which correspond to data of the incoming data stream 102) that were received by the windowed query 114 of the analytics application 108 while the window remained open. Upon receipt of the first stream event 122, the count may be incremented to a value of one at block 410. It is to be appreciated that other types of analytics operations or functions may be performed to generate different types of query results 116, such as, without limitation, aggregation functions that determine aggregate values in terms of minimum values, maximum values, average values, summation values, first values, last values, and so on. Any suitable statistical operation can be used to compute query results 116 for any suitable type of analytics operation/function at block 410.

Moreover, the windowed query 114 may receive more events at block 402, including stream events 122, and upon receiving an additional stream event(s) 122 associated with the grouping key at block 402 while the window remains open, the process 400 may iterate blocks 402, 404, 408, and 410 to collect additional query data and generate additional query results based on the received stream event(s) 122.

Eventually, at block 412, the analytics application 108 may close the window in response to a lapse of the predefined duration. In some embodiments, the window may close based on a lapse of the predefined duration, and further based on receipt of a next event (either a watermark event or a stream event 122) after the lapse of the predefined duration. In other words, the window may close at a time that corresponds to the open time plus the window duration, or, alternatively, the window may close at a later time, such as a time when a next event is received after the lapse of the predefined duration.

At 414, the analytics application 108 may output the query results 116 that were generated at block 410 while the window remained open, and these query results 116 may be output in association with the window. In some embodiments, the outputting of the query results 116 at block 414 includes sending the query results 116 to the destination location 120, and possibly storing the query results 116 at the destination location 120, specified by the customer 104 who created the analytics application 108.

It is to be appreciated that query results 116 can be dynamically generated (and perhaps output) as additional stream events arrive while the window remains open, or, the analytics application 108 may wait to generate and/or output query results until after the window closes at block 412. In other words, block 410 may occur before or after block 412, and/or block 414 may occur before or after block 412.

FIG. 5 is a flow diagram of an example process 500 for allowing a customer 104 to set preferences to have a network-based data analytics service 106 merge partial results on the customer's behalf. The process 500 is described, by way of example, with reference to the previous figures.

At 502, a data analytics service 106 of a network-based analytics system 100 may cause a user interface to be displayed on a computing device 110 of a customer 104 for the customer 104 to set preferences to have the data analytics service 106 merge partial results on the customer's behalf. It is noted that the techniques and systems described herein for executing windowed queries 114 against streaming data that are configured to open windows based on the receipt of stream events 122 may mitigate instances where partial results are included in the query results 116, while not wholly eliminating them. For instance, if stream events 122 arrive with a significant delay (e.g., the processing time (PT) timestamp is separated more than a threshold amount of time from the event time (ET) timestamp of the incoming record 202), the query results 116 may still include some partial results for these extreme cases of significantly late events 122. As such, the customer 104 may set preferences to have the data analytics service 106 merge partial results on their behalf, if and when there is a significant delay in the arrival of a stream event 122.

Figure 6:
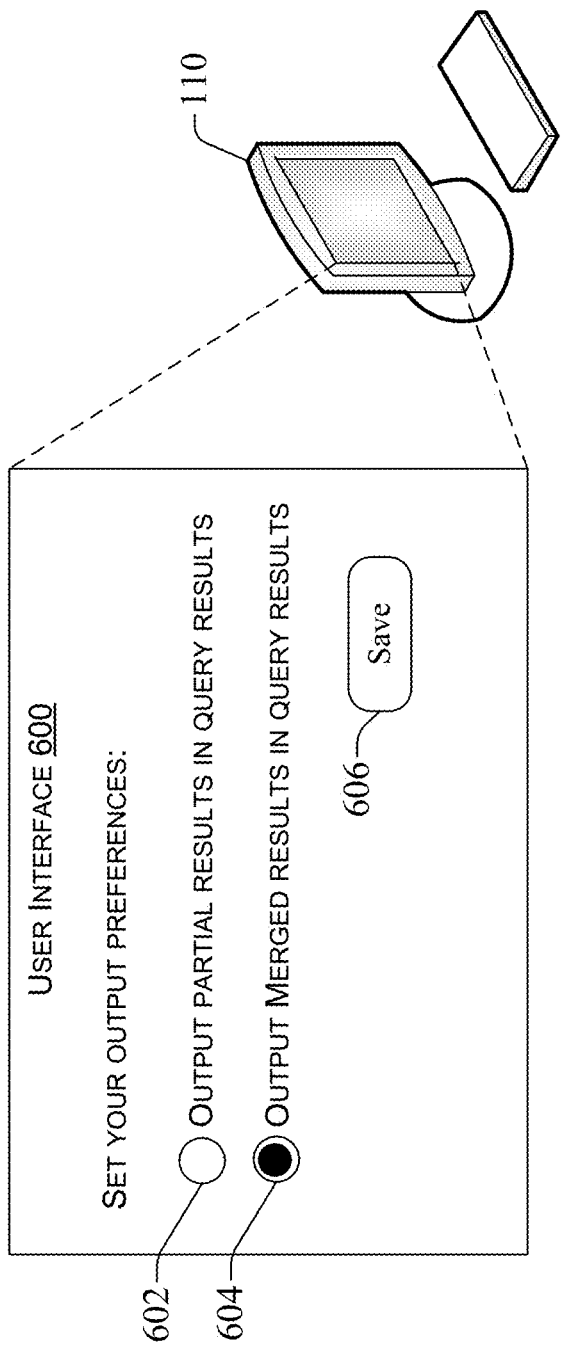
FIG. 6 illustrates an example user interface that can be displayed on a customer's computing device for setting preferences to have the network-based analytics service merge partial results on the customer's behalf.

As shown by the sub-block 504, the user interface may present a first selectable option to output partial query results and a second selectable option to output merged query results. Turning briefly to FIG. 6, an example user interface 600 is shown as being displayed on an example computing device 110 of a customer 104. The user interface 600 may represent a user interface that can be displayed at block 502 of the process 500. As shown in FIG. 6, the user interface 600 presents a first selectable option 602 to output partial query results, and a second selectable option 604 to output merged query results. In other words, the customer 104 can choose (by selecting the second selectable option 604) to have the system 100 (e.g., via the service 106) merge partial query results, if any are generated, on behalf of the customer 104. The user interface 600 may include a "Save" button 606 to save the user preferences regarding the outputting of partial or merged results.

Referring again to FIG. 5, the process 500 may continue at block 506 determining, in response to receiving customer input to the user interface 600, whether the customer 104 has selected the second selectable option 604 to output the merged query results. If the determination at block 506 is that the customer 104 has selected the second selectable option 604 to output the merged query results, the process 500 may follow the "yes" route from block 506 to block 508.

At 508, a windowed query 114 of an analytics application 108 may execute against an incoming data stream 102. For example, the process 400 may execute at block 508 in order to generate query results 116, wherein first query results 116 may be based on one or more stream events 122 received during a first window, and second query results 116 may be based on one or more stream events 122 received during a second window. For example, a first window may open at a time when a first stream event 122(1) associated with a grouping key of the first window is received by the windowed query 114 of the analytics application 108. The first event 122(1), being a stream event, corresponds to first data of the incoming data stream 102. This first window may remain open to receive any additional stream events 122 associated with the grouping key while the first window remains open, and first query results 116 may be generated for the first window until the first window closes. The first query results 116 may be output in association with the first window. After the first window has closed, a second window may open at a second time when an additional (e.g., a second) stream event 122 associated with the grouping key is received by the windowed query 114 of the analytics application 108, the additional event 122, being a stream event, corresponds to second data of the incoming data stream 102. The second window may remain open to receive any additional events associated with the grouping key while the second window remains open, and second query results 116 may be generated for the second window until the second window closes. The second query results 116 may be output in association with the second window.

At 510, the system 100 (e.g., the analytics application 108) may determine to merge the second query results 116 of the second window with the first query results 116 of the first window. In some embodiments, the determination at block 510 may be based at least in part on respective client-supplied timestamps (e.g., ET timestamps) of the first event 122(1) and the additional (e.g., second) event 122. That is, if, based on an event time (ET) timestamp of the additional (e.g., second) event 122 (and ET timestamps of any other stream events received during the second window), the system 100 determines that the additional (e.g., second) event 122 of the second window is a late arriving event that should have been grouped in the first window with the first event 122(1), the system 100 may determine to merge the query results 116 of the two windows. This can be determined based on a threshold amount of time separating the ET timestamp and the PT timestamp for any give record (or event 122 corresponding to a record).

At 512, the system 100 (e.g., via the analytics application 108) may output the merged query results including the first query results 116 and the second query results 116 in association with the first window.

Returning to block 506, if the determination at block 506 is that the customer 104 has selected the first selectable option 602 to output partial query results, the process 500 may follow the "no" route from block 506 to block 514.

At 514, a windowed query 114 of an analytics application 108 may execute against an incoming data stream 102. For example, the process 400 may execute at block 508 in order to generate query results 116, wherein first query results 116 may be based on one or more stream events 122 received during a first window, and second query results 116 may be based on one or more stream events 122 received during a second window. This may be similar to the description of block 508.

At 516, the system 100 (e.g., via the analytics application 108) may output partial query results including the first query results 116 in association with the first window, and the second query results 116 in association with the second window.

Figure 7:
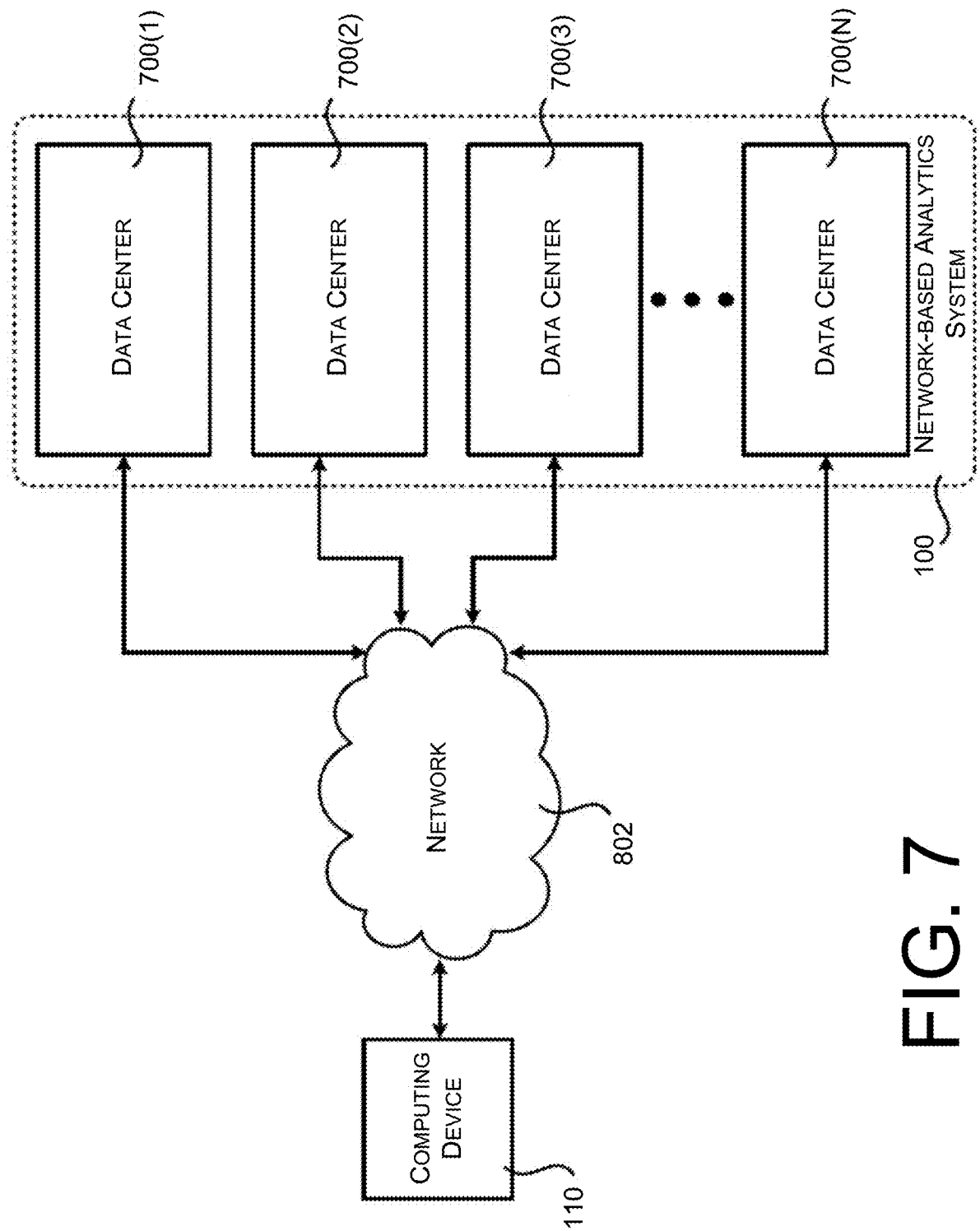
FIG. 7 is a system and network diagram that shows an illustrative operating environment that includes a network-based analytics system that can be configured to implement aspects of the functionality described herein.

FIG. 7 is a system and network diagram that shows an illustrative operating environment that includes a network-based analytics system 100 that can be configured to implement aspects of the functionality described herein. As discussed briefly above, the network-based analytics system 100 can execute network services, such as the data analytics service 106, that provide computing resources, such as analytics applications 108(1)-(P), on a permanent or an as-needed basis. Among other types of functionality, the computing resources provided by network-based analytics system 100, or by a larger system of which the network-based analytics system 100 is a part, can be utilized to implement the various network services described herein. As also discussed above, the network-based analytics system 100 may be part of a larger system that provides the additional computing resources that include, without limitation, data storage resources, data processing resources, such as VM instances, networking resources, data communication resources, network services, and other types of resources.

Each type of computing resource provided by network-based analytics system 100, or by a larger system of which the network-based analytics system 100 is a part, can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The network-based analytics system 100, or a larger system of which the network-based analytics system 100 is a part, can also be configured to provide other types of computing resources not mentioned specifically herein.

The computing resources provided by network-based analytics system 100, or a larger system of which the network-based analytics system 100 is a part, are enabled in one implementation by one or more data centers 700(1), 700(2), 700(3), . . . , 700(N) (collectively 700). The data centers 700 are facilities utilized to house and operate computer systems and associated components. The data centers 700 typically include redundant and backup power, communications, cooling, and security systems. The data centers 700 can also be located in geographically disparate locations. One illustrative configuration for a data center 700 that can be utilized to implement the technologies disclosed herein will be described below with regard to FIG. 8.

The users of the network-based analytics system 100 can access the computing resources, such as analytics applications 108, provided by the network-based analytics system 100 over a network 702, which can be a wide area communication network ("WAN"), such as the Internet, an intranet or an Internet service provider ("ISP") network or a combination of such networks. For example, and without limitation, a computing device 110 operated by a user of the network-based analytics system 100 can be utilized to access the network-based analytics system 100 by way of the network 702. It should be appreciated that a local-area network ("LAN"), the Internet, or any other networking topology known in the art that connects the data centers 700 to remote customers and other users can be utilized. It should also be appreciated that combinations of such networks can also be utilized.

Figure 8:
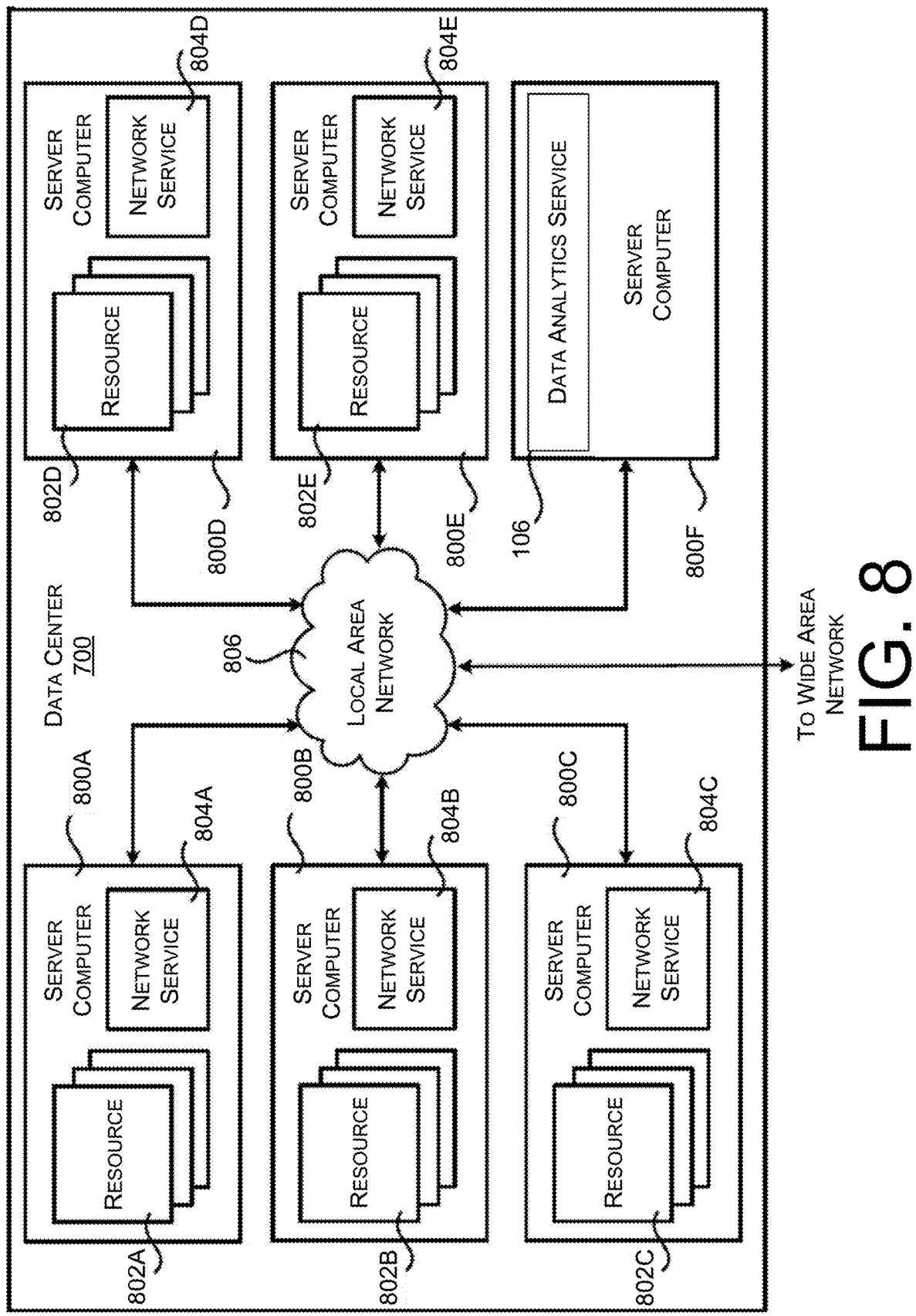
FIG. 8 is a computing system diagram illustrating a configuration for a data center that can be utilized to implement aspects of the technologies disclosed herein.

FIG. 8 is a computing system diagram that illustrates one configuration for a data center 700 that can be utilized to implement the data analytics service 106, and/or any other network services disclosed herein. The example data center 700 shown in FIG. 8 includes several server computers 800A-800E (collectively 800) for providing the computing resources 802A-802E (collectively 802), respectively.

The server computers 800 can be standard tower, rack-mount, or blade server computers configured appropriately for providing the various computing resources described herein (illustrated in FIG. 8 as the computing resources 802A-802E). As mentioned above, the computing resources 802 provided by the network-based analytics system 100, or a larger system of which the network-based analytics system 100 is a part, can include, without limitation, analytics applications 108, data storage resources, data processing resources such as VM instances or hardware computing systems, database resources, networking resources, and others. Some of the servers 800 can also be configured to execute network services 804A-804E (collectively 804) capable of instantiating, providing and/or managing the computing resources 802, some of which are described in detail herein.

The data center 700 shown in FIG. 8 also includes a server computer 800F that can execute some or all of the software components described above. For example, and without limitation, the server computer 800F can be configured to execute the data analytics service 106. The server computer 800F can also be configured to execute other components and/or to store data for providing some or all of the functionality described herein. In this regard, it should be appreciated that components or different instances of the data analytics service 106 can execute on many other physical or virtual servers in the data centers 700 in various configurations.

In the example data center 700 shown in FIG. 8, an appropriate LAN 806 is also utilized to interconnect the server computers 800A-800F. The LAN 806 is also connected to the network 702 illustrated in FIG. 7. It should be appreciated that the configuration of the network topology described herein has been greatly simplified and that many more computing systems, software components, networks, and networking devices can be utilized to interconnect the various computing systems disclosed herein and to provide the functionality described above.

Appropriate load balancing devices or other types of network infrastructure components can also be utilized for balancing a load between each of the data centers 700(1)-(N), between each of the server computers 800A-800F in each data center 700, and, potentially, between computing resources 802 in each of the data centers 700. It should be appreciated that the configuration of the data center 700 described with reference to FIG. 8 is merely illustrative and that other implementations can be utilized.

Figure 9:
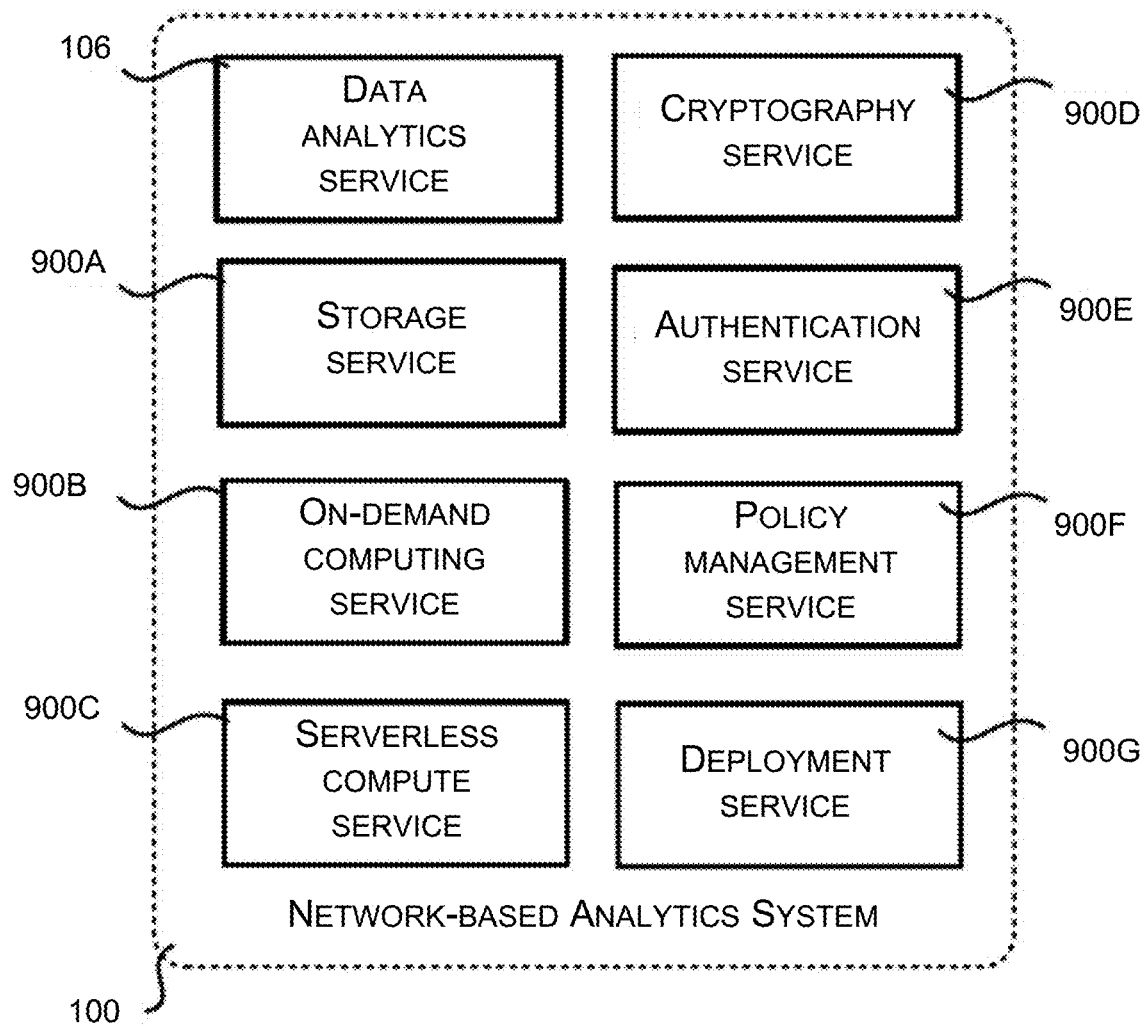
FIG. 9 is a network services diagram that shows aspects of several services that can be provided by and utilized within a network-based analytics system, or a larger system of which the network-based analytics system is a part, which is configured to implement the various technologies disclosed herein.

FIG. 9 is a network services diagram that shows aspects of several services that can be provided by and utilized within a network-based analytics system 100, or a larger system of which the network-based analytics system 100 is a part, which is configured to implement the various technologies disclosed herein. In particular, and as discussed above, the network-based analytics system 100, or a larger system of which the network-based analytics system 100 is a part, can provide a variety of network services to customers and other users including, but not limited to, the data analytics service 106, a storage service 900A, an on-demand computing service 900B, a serverless compute service 900C, a cryptography service 900D, an authentication service 900E, a policy management service 900F, and a deployment service 900G. The network-based analytics system 100, or a larger system of which the network-based analytics system 100 is a part, can also provide other types of network services, some of which are described below.

It is to be appreciated that users or customers of the network-based analytics system 100 can include organizations or individuals that utilize some or all of the network services provided by the network-based analytics system 100, or a larger system of which the network-based analytics system 100 is a part. As described above, customers 104 can communicate with the network-based analytics system 100 using an appropriate computing device 110 through a network, such as the network 702 shown in FIG. 7.

It is also noted that not all configurations described include the network services shown in FIG. 9 and that additional network services can be provided in addition to, or as an alternative to, the services explicitly described herein. Each of the services shown in FIG. 9 can also expose web service interfaces that enable a caller to submit appropriately configured API calls to the various services through web service requests. The various web services can also expose GUIs, command line interfaces ("CLIs"), and/or other types of interfaces for accessing the functionality that they provide. In addition, each of the services can include service interfaces that enable the services to access each other. Additional details regarding some of the services shown in FIG. 9 will now be provided.

The storage service 900A can be a network-based storage service that stores data obtained from customers 104 of the network-based analytics system 100, or a larger system of which the network-based analytics system 100 is a part. The data stored by the storage service 900A can be obtained from computing devices 110 of customers.

The on-demand computing service 900B can be a collection of computing resources configured to instantiate VM instances and to provide other types of computing resources 802 on demand. For example, a user of the network-based analytics system 100, or a larger system of which the network-based analytics system 100 is a part, can interact with the on-demand computing service 900B (via appropriately configured and authenticated API calls, for example) to provision and operate VM instances that are instantiated on physical computing devices hosted and operated by the network-based analytics system 100, or a larger system of which the network-based analytics system 100 is a part. The VM instances can be used for various purposes, such as to operate as servers supporting the network services described herein, a web site, to operate business applications or, generally, to serve as computing resources for the user.

Other applications for the VM instances can be to support database applications, electronic commerce applications, business applications and/or other applications. Although the on-demand computing service 900B is shown in FIG. 9, any other computer system or computer system service can be utilized in the network-based analytics system 100, or a larger system of which the network-based analytics system 100 is a part, to implement the functionality disclosed herein, such as a computer system or computer system service that does not employ virtualization and instead provisions computing resources on dedicated or shared computers/servers and/or other physical devices.

The serverless compute service 900C is a network service that allows users to execute code (which might be referred to herein as a "function") without provisioning or managing server computers in the network-based analytics system 100, or a larger system of which the network-based analytics system 100 is a part. Rather, the serverless compute service 900C can automatically run code in response to the occurrence of events. The code that is executed can be stored by the storage service 900A or in another network accessible location.

In this regard, it is to be appreciated that the term "serverless compute service" as used herein is not intended to infer that servers are not utilized to execute the program code, but rather that the serverless compute service 900C enables code to be executed without requiring a user to provision or manage server computers. The serverless compute service 900C executes program code only when needed, and only utilizes the resources necessary to execute the code. In some configurations, the user or entity requesting execution of the code might be charged only for the amount of time required for each execution of their program code.

The network-based analytics system 100, or a larger system of which the network-based analytics system 100 is a part, can also include a cryptography service 900D. The cryptography service 900D can utilize storage services of the network-based analytics system 100, or a larger system of which the network-based analytics system 100 is a part, such as the storage service 900A, to store encryption keys in encrypted form, whereby the keys can be usable to decrypt user keys accessible only to particular devices of the cryptography service 900D. The cryptography service 900D can also provide other types of functionality not specifically mentioned herein.

The network-based analytics system 100, or a larger system of which the network-based analytics system 100 is a part, in various configurations, also includes an authentication service 900E and a policy management service 900F. The authentication service 900E, in one example, is a computer system (i.e., collection of computing resources 802) configured to perform operations involved in authentication of users or customers. For instance, one of the services shown in FIG. 9 can provide information from a user or customer to the authentication service 900E to receive information in return that indicates whether or not the requests submitted by the user or the customer are authentic.

The policy management service 900F, in one example, is a network service configured to manage policies on behalf of users or customers of the network-based analytics system 100, or a larger system of which the network-based analytics system 100 is a part. The policy management service 900F can include an interface (e.g. API or GUI) that enables customers to submit requests related to the management of policy, such as a security policy. Such requests can, for instance, be requests to add, delete, change or otherwise modify policy for a customer, service, or system, or for other administrative actions, such as providing an inventory of existing policies and the like.

The network-based analytics system 100, or a larger system of which the network-based analytics system 100 is a part, can additionally maintain other network services based, at least in part, on the needs of its customers. For instance, the network-based analytics system 100, or a larger system of which the network-based analytics system 100 is a part, can maintain a deployment service 900G for deploying program code in some configurations. The deployment service 900G provides functionality for deploying program code, such as to virtual or physical hosts provided by the on-demand computing service 900B. Other services include, but are not limited to, database services, object-level archival data storage services, and services that manage, monitor, interact with, or support other services. The network-based analytics system 100, or a larger system of which the network-based analytics system 100 is a part, can also be configured with other network services not specifically mentioned herein in other configurations.

Figure 10:
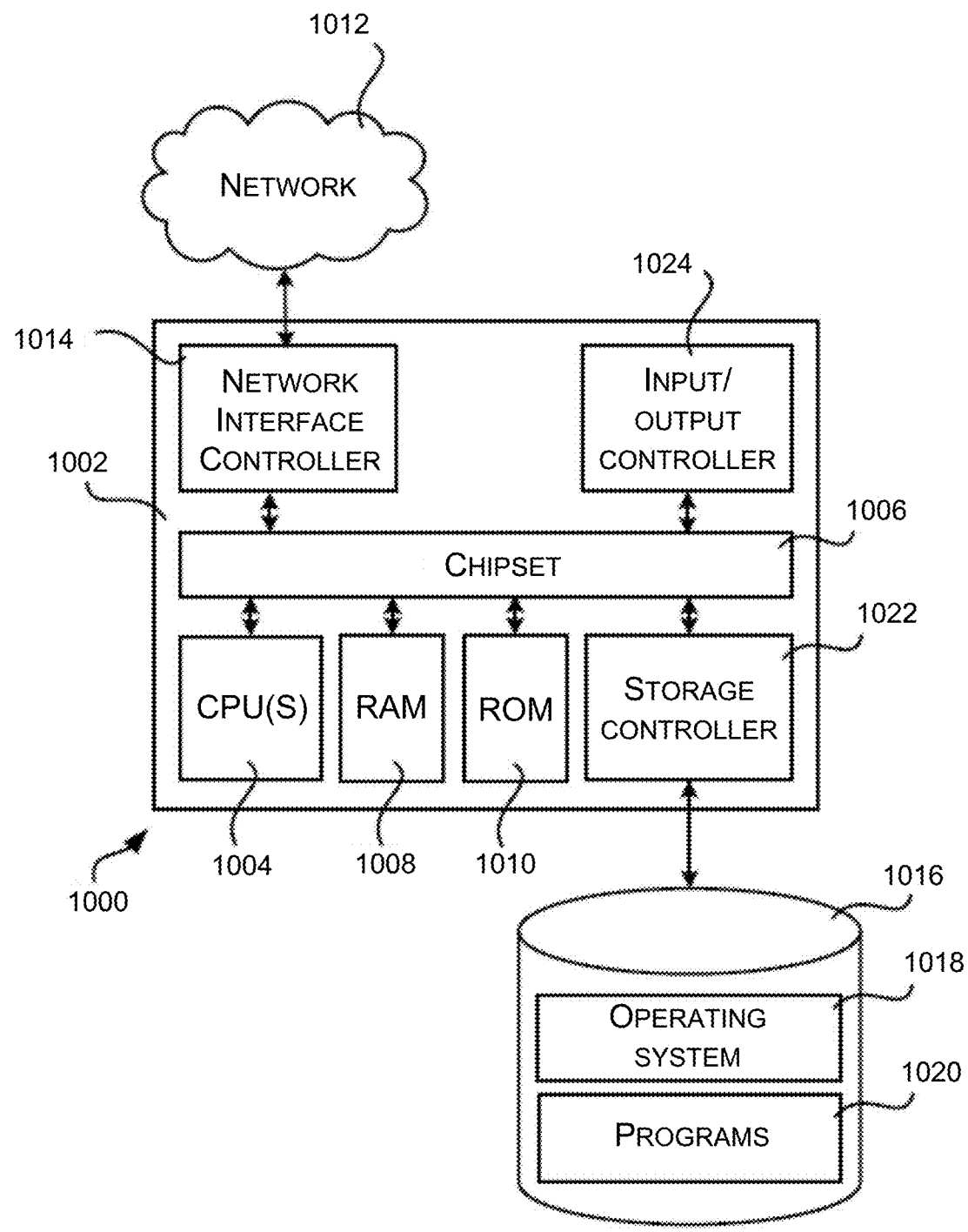
FIG. 10 is a computer architecture diagram showing an illustrative computer hardware architecture for implementing a computing device that can be utilized to implement aspects of the various technologies presented herein.

FIG. 10 shows an example computer architecture for a computer 1000 capable of executing program components for implementing the functionality described above. The computer architecture shown in FIG. 10 illustrates a conventional server computer, workstation, desktop computer, laptop, tablet, network appliance, e-reader, smartphone, or other computing device, and can be utilized to execute any of the software components presented herein.

The computer 1000 includes a baseboard 1002, or "motherboard," which is a printed circuit board to which a multitude of components or devices can be connected by way of a system bus or other electrical communication paths. In one illustrative configuration, one or more central processing units ("CPUs") 1004 operate in conjunction with a chipset 1006. The CPUs 1004 can be standard programmable processors that perform arithmetic and logical operations necessary for the operation of the computer 1000.

The CPUs 1004 perform operations by transitioning from one discrete, physical state to the next through the manipulation of switching elements that differentiate between and change these states. Switching elements can generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1006 provides an interface between the CPUs 1004 and the remainder of the components and devices on the baseboard 1002. The chipset 1006 can provide an interface to a RAM 1008, used as the main memory in the computer 1000. The chipset 1006 can further provide an interface to a computer-readable storage medium such as a read-only memory ("ROM") 1010 or non-volatile RAM ("NVRAM") for storing basic routines that help to startup the computer 1000 and to transfer information between the various components and devices. The ROM 1010 or NVRAM can also store other software components necessary for the operation of the computer 1000 in accordance with the configurations described herein.

The computer 1000 can operate in a networked environment using logical connections to remote computing devices and computer systems through a network, such as the network 1012. The chipset 1006 can include functionality for providing network connectivity through a NIC 1014, such as a gigabit Ethernet adapter. The NIC 1014 is capable of connecting the computer 1000 to other computing devices over the network 1012. It should be appreciated that multiple NICs 1014 can be present in the computer 1000, connecting the computer to other types of networks and remote computer systems.

The computer 1000 can be connected to a mass storage device 1016 that provides non-volatile storage for the computer. The mass storage device 1016 can store an operating system 1018, programs 1020, and data, which have been described in greater detail herein. The mass storage device 1016 can be connected to the computer 1000 through a storage controller 1022 connected to the chipset 1006. The mass storage device 1016 can consist of one or more physical storage units. The storage controller 1022 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1000 can store data on the mass storage device 1016 by transforming the physical state of the physical storage units to reflect the information being stored. The specific transformation of physical state can depend on various factors, in different implementations of this description. Examples of such factors can include, but are not limited to, the technology used to implement the physical storage units, whether the mass storage device 1016 is characterized as primary or secondary storage, and the like.

For example, the computer 1000 can store information to the mass storage device 1016 by issuing instructions through the storage controller 1022 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1000 can further read information from the mass storage device 1016 by detecting the physical states or characteristics of one or more particular locations within the physical storage units.

In addition to the mass storage device 1016 described above, the computer 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1000.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1016 can store an operating system 1018 utilized to control the operation of the computer 1000. According to one configuration, the operating system comprises the LINUX operating system or one of its variants such as, but not limited to, UBUNTU, DEBIAN, and CENTOS. According to another configuration, the operating system comprises the WINDOWS SERVER operating system from MICROSOFT Corporation. According to further configurations, the operating system can comprise the UNIX operating system or one of its variants. It should be appreciated that other operating systems can also be utilized. The mass storage device 1016 can store other system or application programs and data utilized by the computer 1000.

In one configuration, the mass storage device 1016 or other computer-readable storage media is encoded with computer-executable instructions which, when loaded into the computer 1000, transform the computer from a general-purpose computing system into a special-purpose computer capable of implementing the configurations described herein. These computer-executable instructions transform the computer 1000 by specifying how the CPUs 1004 transition between states, as described above. According to one configuration, the computer 1000 has access to computer-readable storage media storing computer-executable instructions which, when executed by the computer 1000, perform the various processes described above. The computer 1000 can also include computer-readable storage media for performing any of the other computer-implemented operations described herein.

The computer 1000 can also include one or more input/output controllers 1024 for receiving and processing input from a number of input devices, such as a keyboard, a mouse, a touchpad, a touch screen, an electronic stylus, or other type of input device. Similarly, an input/output controller 1024 can provide output to a display, such as a computer monitor, a flat-panel display, a digital projector, a printer, or other type of output device. It will be appreciated that the computer 1000 might not include all of the components shown in FIG. 10, can include other components that are not explicitly shown in FIG. 10, or can utilize an architecture completely different than that shown in FIG. 10.

Based on the foregoing, it should be appreciated that technologies for providing a network service capable of identifying infrequently accessed data from a request stream have been disclosed herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes can be made to the subject matter described herein without following the example configurations and applications illustrated and described, and without departing from the true spirit and scope of the present invention, which is set forth in the following claims.

What is claimed is:

1. A network-based analytics system, comprising:
one or more processors; and
memory storing computer-executable instructions which, when executed by the one or more processors, cause the network-based analytics system to:
cause presentation of a user interface on a display associated with a customer device;
receive, via the user interface, customer input comprising one or more parameters defining a windowed query, wherein the one or more parameters include at least a destination location to receive query results and an incoming data stream of a plurality of incoming data streams;
create, based at least in part on the customer input, an analytics application configured to process the incoming data stream by executing the windowed query against the incoming data stream; and
execute the windowed query against the incoming data stream by:
detecting a receipt of a first stream event associated with a grouping key, the first stream event received by the windowed query at a time and corresponding to first data of the incoming data stream;
responsive to detecting the receipt of the first stream event, opening a window associated with the grouping key at the time;
collecting query data from the incoming data stream for a predefined duration specified in the windowed query of the analytics application, the query data based at least in part on the first stream event and any additional stream events associated with the grouping key that are received before a lapse of the predefined duration;
generating the query results based at least in part on the query data;
closing the window upon the lapse of the predefined duration; and
sending the query results in association with the window to the destination location.

2. The network-based analytics system of claim 1, wherein the windowed query includes an aggregation function, and the query results are at least one of:
a count of a number of stream events associated with the grouping key that were received by the windowed query during the collecting of the query data for the predefined duration;
an average associated with the stream events associated with the grouping key;
a maximum value associated with the stream events associated with the grouping key;
a minimum value associated with the stream events associated with the grouping key; or
a summation value associated with the stream events associated with the grouping key.

3. The network-based analytics system of claim 1, wherein the user interface includes a first selectable option to output partial query results and a second selectable option to output merged query results, and wherein the computer-executable instructions, when executed by the one or more processors, further cause the network-based analytics system to:
receive additional customer input to the user interface selecting the second selectable option to output the merged query results,
wherein executing the windowed query against the incoming data stream further comprises, after the closing of the window:
detecting a second receipt at a second time of a second stream event associated with the grouping key by the windowed query, the second stream event corresponding to second data of the incoming data stream;
opening a second window associated with the grouping key at the second time;
collecting second query data from the incoming data stream for the predefined duration;
generating second query results based at least in part on the second query data;
closing the second window upon a lapse of the predefined duration;
determining to merge the second query results of the second window with the query results of the window; and
outputting the merged query results in association with the window, the merged query results including the query results and the second query results.

4. The network-based analytics system of claim 1, wherein the sending the query results to the destination location comprises causing the query results to be stored at the destination location.

5. The network-based analytics system of claim 1, wherein the computer-executable instructions, when executed by the one or more processors, further cause the network-based analytics system to:
cause presentation of an additional user interface on the display, wherein the additional user interface includes a selectable option that, upon selection, causes the windowed query to be executed on a simulated incoming data stream.

6. A computer-implemented method, comprising:
causing presentation of a user interface via a display of a customer device;
receiving, via the user interface, customer input comprising one or more parameters defining a windowed query, wherein the one or more parameters include at least a destination location to receive query results and an incoming data stream of a plurality of incoming data streams;

creating, based at least in part on the customer input, an analytics application configured to process the incoming data stream by executing the windowed query against the incoming data stream;

detecting, by the analytics application, a receipt, by the windowed query, of a first stream event associated with a grouping key, the first stream event corresponding to first data of an incoming data stream that is being processed by the analytics application using the windowed query;

responsive to the receipt of the first stream event, collecting, by the analytics application, query data for a predefined duration specified in the windowed query, the predefined duration starting at a time when the first stream event is received by the windowed query, the query data based at least in part on the first stream event and any additional stream events associated with the grouping key that are received before a lapse of the predefined duration; and based at least in part on the query data, sending, by the analytics application and to the destination location, the query results in association with a window of the windowed query.

7. The computer-implemented method of claim 6, wherein the one or more parameters further include at least the predefined duration.

8. The computer-implemented method of claim 6, wherein the windowed query includes an aggregation function, and the query results are at least one of:
   a count of a number of stream events associated with the grouping key that were received by the windowed query during the collecting of the query data for the predefined duration;
   an average associated with the stream events associated with the grouping key;
   a maximum value associated with the stream events associated with the grouping key;
   a minimum value associated with the stream events associated with the grouping key; or
   a summation value associated with the stream events associated with the grouping key.

9. The computer-implemented method of claim 6, wherein the user interface presents a first selectable option to output partial query results and a second selectable option to output merged query results, and the method further comprising:
   receiving additional customer input to the user interface selecting the second selectable option to output the merged query results;
   detecting a second receipt of a second stream event associated with the grouping key by the windowed query, the second stream event corresponding to second data of the incoming data stream;
   at least partly in response to the second receipt of the second stream event, collecting second query data for the predefined duration starting at a time when the second stream event is received by the windowed query, the second query data based at least in part on the second stream event and any additional stream events associated with the grouping key that are received before a second lapse of the predefined duration;
   determining to merge second query results of a second window that are based on the second query data with the query results of the window; and
   outputting the merged query results in association with the window, the merged query results including the query results and the second query results.

10. The computer-implemented method of claim 6, wherein the sending the query results to the destination location comprises causing the query results to be stored at the destination location.

11. The computer-implemented method of claim 6, further comprising:
   opening the window of the windowed query at the time when the first stream event is received by the windowed query; and
   closing the window after the lapse of the predefined duration.

12. The computer-implemented method of claim 11, wherein the closing the window is further based on receiving a next stream event associated with the grouping key after the lapse of the predefined duration.

13. One or more non-transitory computer-readable media storing computer-executable instructions that, when executed by one or more processors of a network-based analytics system, cause the network-based analytics system to:
   cause presentation of a user interface via a display associated with a customer device;
   receive, via the user interface, customer input comprising one or more parameters defining a windowed query, wherein the one or more parameters include at least a destination location to receive query results and an incoming data stream of a plurality of incoming data streams;
   open a window of the windowed query at a time when a first stream event associated with a grouping key of the window is received by the windowed query, the first stream event corresponding to first data of the incoming data stream;
   generate query results based at least in part on the first stream event and any additional stream events associated with the grouping key that are received while the window remains open;
   close the window upon a lapse of a predefined duration specified in the windowed query; and
   send the query results to the destination location.

14. The one or more non-transitory computer-readable media of claim 13, wherein the computer-executable instructions, when executed by the one or more processors of the network-based analytics system, further cause the network-based analytics system to:
   create, based at least in part on the customer input, an analytics application to process the incoming data stream by executing the windowed query against the incoming data stream.

15. The one or more non-transitory computer-readable media of claim 13, wherein the sending the query results to the destination location comprises causing the query results to be stored at the destination location.

16. The one or more non-transitory computer-readable media of claim 13, wherein the windowed query includes an aggregation function, and the query results are at least one of:
   a count of a number of stream events associated with the grouping key that were received by the windowed query while the window remained open;
   an average associated with the stream events associated with the grouping key;
   a maximum value associated with the stream events associated with the grouping key;
   a minimum value associated with the stream events associated with the grouping key; or a summation value associated with the stream events associated with the grouping key.

17. The one or more non-transitory computer-readable media of claim 13, wherein the user interface presents a first selectable option to output partial query results and a second selectable option to output merged query results, wherein the computer-executable instructions, when executed by the one or more processors of the network-based analytics system, further cause the network-based analytics system to:
receive additional customer input to the user interface selecting the second selectable option to output the merged query results;
open a second window at a second time when a second stream event associated with the grouping key is received by the windowed query, the second stream event corresponding to second data of the incoming data stream;
generate second query results based at least in part on the second stream event and any additional stream events associated with the grouping key that are received while the second window remains open;
close the second window upon a lapse of the predefined duration;
determine to merge the second query results of the second window with the query results of the window; and
output the merged query results in association with the window, the merged query results including the query results and the second query results.

18. The one or more non-transitory computer-readable media of claim 13, wherein closing the window is further based on receiving a next stream event associated with the grouping key after the lapse of the predefined duration.

19. The one or more non-transitory computer-readable media of claim 13, wherein the one or more parameters further include the predefined duration.

20. The one or more non-transitory computer-readable media of claim 13, wherein the one or more parameters further include the grouping key.

* * * * *